July 27, 1965  V. M. BARNES, JR  3,196,974
FAST ACTING SENSITIVE PRESSURE SWITCH
Filed Aug. 14, 1961  2 Sheets-Sheet 1
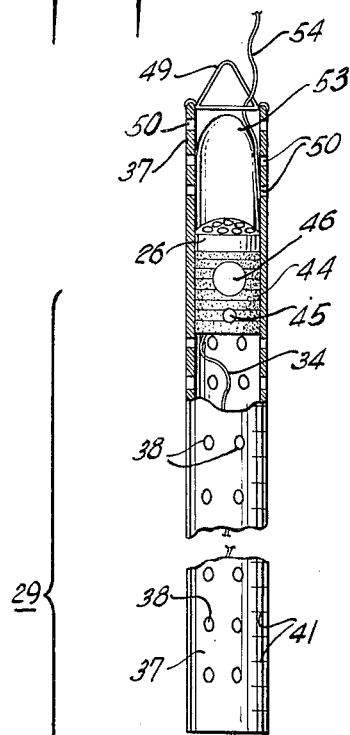
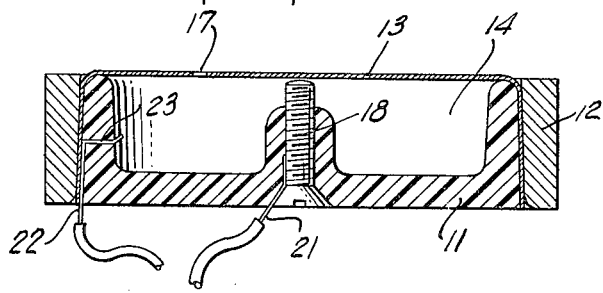
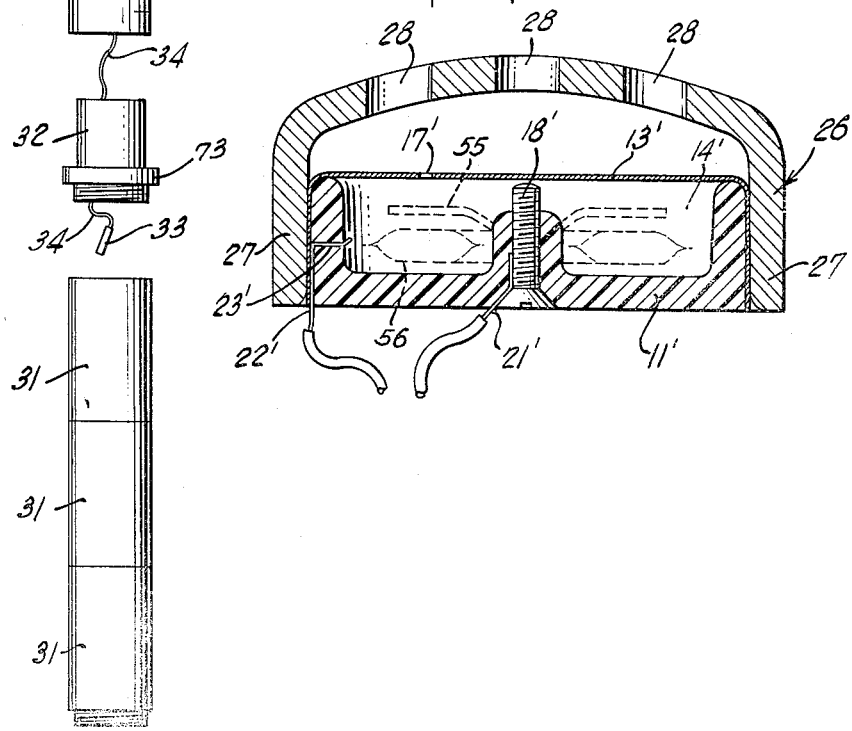

July 27, 1965 V. M. BARNES, JR 3,196,974
FAST ACTING SENSITIVE PRESSURE SWITCH
Filed Aug. 14, 1961 2 Sheets-Sheet 2

United States Patent Office 3,196,974
Patented July 27, 1965

3,196,974
FAST ACTING SENSITIVE PRESSURE SWITCH
Vernon M. Barnes, Jr., Richmond, Va., assignor to Texaco Experiment Incorporated, Richmond, Va., a corporation of Virginia
Filed Aug. 14, 1961, Ser. No. 131,324
7 Claims. (Cl. 181—.5)

This invention is concerned with a pressure actuated switch in general. More specifically a switch according to this invention is one for a special use that is concerned with seismic exploration generally and more specifically with reflection type seismic operations. The shooting technique to which this invention is especially applicable is sometimes known as sequential shooting.

Heretofore a broad concept has been presented in relation to employing a pressure actuated switch located adjacent to each charge of a plurality of charges in a shot hole, so as to provide for so-called sequential shooting that acts to reinforce the seismic wave front traveling in a given direction, i.e. either up or down the shot hole. This is accomplished by having each successive charge detonated in response to the arrival of the first seismic pressure wave traveling largely along the formation surrounding the shot hole. Such concept is fully disclosed and described in a U.S. patent to W. T. Kelly et al. No. 2,922,484 issued January 26, 1960. The technique there disclosed is that to which a switch in accordance with this invention is to be applied.

It has been found in actual practice that in spite of the theoretical advantages to be gained by sequential shooting, such as generally indicated in the Kelly et al. patent mentioned above, the lack of a fast acting sufficiently sensitive switch has rendered the technique at best very unrealiable. Consequently it is an object of this invention to provide an improved fast acting sensitive pressure actuated switch for use in the foregoing technique.

As a practical matter, in order to successfully provide for a sequential shooting operation in which each charge is detonated in turn by the arrival of a seismic pressure wave in the vicinity thereof, the time delay involved in regard to the switching action for initiating such detonations should be on the order of about one-tenth millisecond. In addition, the constancy of the delay time should be within tolerable limits. Heretofore, no such short time delay switch action that has adequate constancy in the time delay involved, has been available.

Thus, it is another object of this invention to provide a pressure sensitive switch that is superior in providing for fast acting short delay time, plus accuracy in the delay involved and having the ability to be actuated by seismic pressure waves.

It is another object of this invention to provide for a seismic pressure actuated switch including structure for spacing the switch elements from the charge to be detonated when the switch contacts are closed.

Briefly, the invention may be described as a fast acting sensitive pressure switch for use in seismic sequential shooting and the like. The switch comprises a thin diaphragm including at least some conductive material that is subject to seismic pressure waves, and means for electrically connecting said diaphragm to act as one contact of said switch. The switch also comprises a centrally located conductive material member that is located very close to but not in contact with said diaphragm in the absence of any pressure wave actuation of the diaphragm.

Again briefly, the invention may be described as a fast acting sensitive pressure switch for use in seismic sequential shooting and the like which comprises a thin low-inertia metallic diaphragm solely subject to seismic pressure waves. The switch also comprises means for electrically connecting said diaphragm to act as one contact of said switch, and a centrally located conductive material member acting as the other contact of said switch. The said member has the extremity thereof located very close to but not in contact with said diaphragm in the absence of any pressure wave actuation of the diaphragm, and the said diaphragm has a small vent passage therethrough for allowing equalization of the static pressure being applied. The switch also comprises a support structure for the foregoing pressure responsive switch elements to space the latter a predetermined distance away from an explosive charge that is to be detonated under control of the closing of said switch, and the said support structure comprises a tubular fibrous material cylinder which is perforated to equalize pressure therein. The said cylinder has calibration markings thereon for use in cutting the cylinder to a predetermined length based on the seismic velocity of the formation surrounding said switch and explosive charge.

The foregoing and other objects and benefits of the invention may be fully appreciated in connection with the more detailed description which follows, and which is illustrated in the drawings, in which:

FIGURE 1 is an elevation partly broken away in longitudinal cross-section, illustrating a complete unit employing a switch according to the invention in addition to a spacing element associated therewith;

FIGURE 2 is an enlarged transverse cross-section view illustrating one modification of the pressure actuated switch per se;

FIGURE 3 is an enlarged transverse cross-section view showing another modification of the pressure actuated switch elements per se;

Figure 4:
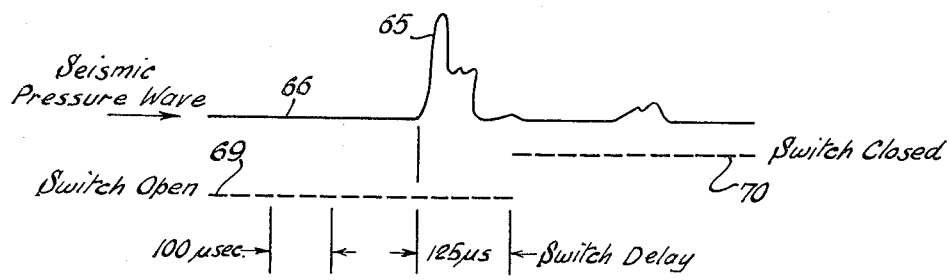
FIGURE 4 is a graph showing the delay time involved in the use of a switch according to this invention; and, FIGURE 5 is a schematic circuit diagram illustrating the electrical circuit arrangement for firing a charge under control of a switch according to this invention.

Referring to FIGURE 2, it is to be observed that the switch elements involved in a fast acting highly sensitive pressure type switch according to this invention include a round (in plan view) insulating material central body 11 that has a slightly tapered circumferential exterior surface, over which is fitted a ring 12 that acts to stretch and clamp an aluminum diaphragm 13 over a dish-like open ended central portion 14, within the body 11.

The diaphragm 13 is preferably made of aluminum, as indicated above, but may be made of other materials so long as the material employed is relatively light or has a low mass in order to reduce the inertia of the diaphragm to a minimum while still employing an electrically conductive material as the diaphragm material itself. In this manner, the diaphragm 13 acts as one contact of the pressure switch structure per se. It will be appreciated that the same results can be accomplished by using a diaphragm of non-conductive material if it is coated with a conductive layer. In like manner, the diaphragm could be non-conductive material with a printed circuit type conductive path.

It is pointed out that there is a vent passage 17 through the diaphragm 13 at any convenient location such that it may act to transfer changes in pressure from the outside of the diaphragm 13 to the central hollow portion 14 for for avoiding undue stress on the diaphragm and so as to allow the diaphragm to always reach a state of equilibrium under normal static pressure conditions. It may be noted that the size of the vent passage 17 is somewhat critical in that it must not pass pressure changes through the diaphragm to such an extent that the sensitivity of the diaphragm action in response to seismic pressure waves is unduly impaired.

Centrally located in body 11, there is a conductive material screw 18 that acts as the other contact for the switch elements. The construction of the body 11 and screw 18 are made such as to provide for a firm positioning of the screw 18 at a very close clearance distance beneath the diaphragm 13 when the diaphragm is subjected to no pressure differentials between the exterior and interior faces thereof. Of course, the screw 18 may be constructed of any appropriate conductive material, such as brass or the like. It will be additionally observed that there is a lead wire 21 which is attached in any feasible manner, for good electrical connection to the screw 18 and has an insulation covering thereon where it extends out from the body 11 of the switch.

In order to connect the diaphragm 13 into an electrical circuit with the other switch contact (screw 18), there is another lead wire 22. Lead wire 22 is fastened into the body member 11 in good electrical contact with the diaphragm 13 in any convenient manner, such as that illustrated where the wire 22 extends through a radially extending hole 23 in the body 11 and then bends down along the outside surface of the body 11 to be pressed firmly in good electrical contact with the diaphragm 13 where it is clamped between the outer surface of body 11 and the inside surface of clamping ring 12.

If the above mentioned diaphragm structure employing a printed circuit of such type conductive path structure were employed, it would be necessary, of course, to have the conductive path extend to the location where lead wire 22 is located. The foregoing is true unless some other arrangement or different structure were to be employed for carrying the diaphragm side of the switch contacts out from the switch.

In FIGURE 3 there is illustrated a modification that is in most respects identical to that of FIGURE 2 described above. Consequently corresponding parts will have corresponding reference numerals plus a prime mark, applied thereto. The only element which has a different construction in the FIGURE 3 type switch, is clamping ring 12 of FIGURE 2 which in the FIGURE 3 modification takes the form of a dome-like guard member 26 having a flange-like ring portion 27 extending downward (when viewed as shown in FIGURE 3) so as to fit snugly over the body 11' and act in the same manner as ring 12 of the FIGURE 2 modification. Thus, the flange ring 27 stretches and securely clamps the diaphragm 13' in place. In the dome portion of member 26 there is a plurality of large holes or openings 28 to permit free passage of the fluid which is subjected to seismic wave energies that will act upon the diaphragm 13' of the switch.

Referring now to FIGURE 1, there is illustrated an entire unit 29 that is constructed for incorporating a pressure sensitive switch, such as the one shown by the modifications of FIGURES 2 and 3, into a more comprehensive structure for providing spacing of the seismic pressure sensitive elements of the switch from an explosive charge that is to be detonated under control of the switch contacts. An illustrative form of such a unit may be in accordance with the structure shown in FIGURE 1, where there is a seismic type explosive charge 31. This charge may be any of various commercially available explosive materials and is preferably one which is supplied in containers having threaded ends for attaching any number of such containers together to make up a charge of desired size. Thus the illustrated explosive charge 31 has three units fastened together and at the top there is a shield or primer attachment unit 32 which may be screwed into the upper charge container 31. Shield unit 32 supports an electrical type blasting cap 33 by having a pair of insulated lead wires 34 thereof pass through the unit 32. Blasting cap 33 is a standard type of explosive detonation initiator that is commonly used in seismic operations. The lead wires 34 are attached to the cap 33 and extend up through the attachment unit 32 as well as on up inside of a fibrous material sleeve 37 that has a plurality of perforations 38 therein to avoid collapsing of the sleeve under pressure. Such pressure will be encountered as the unit is placed down some distance in a mud or water filled shot hole. The sleeve 37 is preferably constructed of a paper board or the like material that is easily cut with a knife, but that is ordinarily moisture protected by being impregnated with a wax coating or the like. It is pointed out that there are calibration markings 41 on the exterior surface of the sleeve 37 so that the sleeve may be cut to a predetermined desired length in connection with setting up the spacing between the seismic pressure sensitive switch elements and the charge to be detonated.

Within the sleeve 37 near the upper end thereof, there is a composite unit 44 which is preferably molded to form a snugly fitted cylinder that is securely fastened to the sleeve 37 so as to avoid any longitudinal movement relative thereto. Within the unit 44, there is included a resistor 45 and a firing capacitor 46 which both act in the electrical circuit in conjunction with the switch contact elements per se, as will be more fully described below. Also molded into the unit 44 at the upper end thereof (as viewed in FIGURE 1) there is a seismic pressure sensitive switch unit, e.g. like that illustrated in FIGURE 3. Such switch unit includes the protective member 26 on the outside of the switch elements.

When the molded unit 44 is in place in the composite charge firing unit 29, one of the lead wires 21' or 22' is connected directly to one of the pair of lead wires 34 that lead to the blasting cap 33, while the other wire 21' or 22' leads to one terminal of each of the resistor 45 and the capacitor 46. The other of the pair of wires 34 is connected to the other terminal or electrode of the capacitor 46 and then extends on up the hole as one of a pair of charging lead wires 54. The remaining terminal of the resistor 45 is connected to the other of the pair of charging lead wires 54.

At the extreme upper end of the entire unit 29 illustrated in FIGURE 1, there is a handle type element for general handling of the unit. For example, there is illustrated a triangular wire bail 49 that is fastened to the upper edges of the sleeve 37. This handle facilitates carrying the unit as well as providing a surface for receiving pressure in case the unit needs to be tamped or otherwise forced into the shot hole. There are additional perforations 50 close to the upper end of the sleeve 37 so as to allow free passage of that shot hole fluid therethrough in order that seismic pressure waves may be freely transmitted to the inside of the sleeve 37.

In addition, there is employed a moisture protective, freely collapsible diphragm 53 that contains air therein but that will be compressed and correspondingly collapsed depending upon the amount of pressure involved as the unit 29 is placed deeper in the shot hole liquid surrounding the whole unit. However, for improved acoustic coupling for the passage of the seismic pressure waves, the protective diaphragm 53 may be filled with an electrically insulating non-corrosive liquid. In the latter event, it will be appreciated that there will be needed an arrangement to provide for compressibility of the fluid on the underside of diaphragm 13'. Thus as illustrated in dashed lines in FIGURE 3, there may be a retainer 55 that is press fastened over the central hub which surrounds screw 18'. Underneath this retainer 55 there is an annular torus bladder 56 which contains air or an inert gas and which is made of a rubber or fully elastic substance. In this manner, when seismic pressure wave energies are transmitted through the non-corrosive liquid within collapsible diaphragm 53 and impinge upon the diaphragm 13', movement of the diaphragm is created by reason of the presence of bladder 56 containing a gas. In other words the total effect of the gas filled bladder in the liquid on the underside of the diaphragm 13', is that of a compressible fluid. Therefore the diaphragm 13' will be actuated by seismic pressure waves to move down, i.e., be depressed into contact with the central contact screw 18', as already described above.

Figure 5:
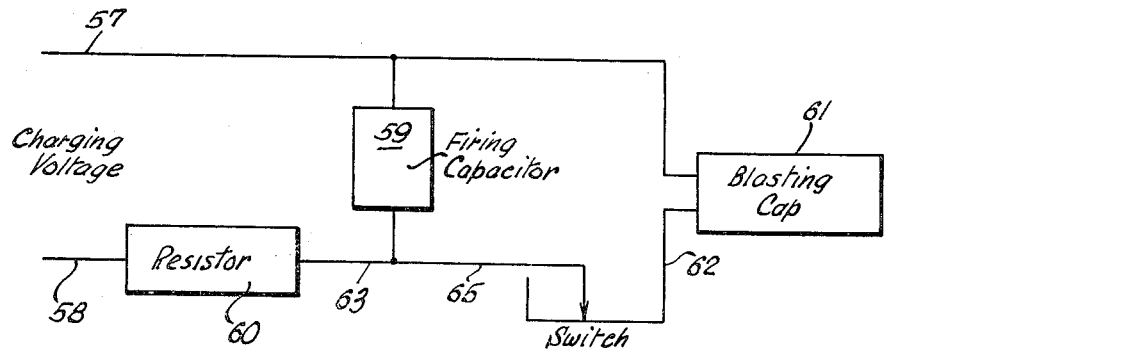

Referring to FIGURE 5, it is pointed out that the electrical circuit arrangement employed is substantially the same as that disclosed in the Kelly et al. patent, supra, and is such that a charging voltage will be applied to a pair of wires 57 and 58 which correspond to the pair 54 in FIGURE 1. These charging wires are connected to a source of power having sufficient voltage in order to charge a firing capacitor 59 that in turn corresponds to capacitor 46 of FIGURE 1. Capacitor 59 is connected between wire 57 and a wire 63 that is connected to the other end of a resistor 60 which has one end connected to the wire 58. Wire 57 continues on and connects to one terminal of a blasting cap 61 that corresponds to the cap 33 of FIGURE 1, while the other terminal of cap 61 is connected via a wire 62 to one terminal of the pressure actuated switch. Thus, the wire 57 extended and the wire 62 both correspond to the pair of wires 34 in FIGURE 1.

As indicated by the schematic showing in FIGURE 5, the preferable one of the contacts of the pressure switch to be connected to wire 62 (corresponding to one of pair 34 in FIGURE 1) is that which connects to the diaphragm of the switch, while the other contact of the pressure switch is connected via a wire 65 to one side of the capacitor 59 and also one end of the resistor 60.

As has been clearly described in the aforementioned Kelly et al. patent, the operation of firing each charge under control of the associated pressure switch is such as to be in accordance with the following procedure. After the unit, including pressure switch and explosive charge to be detonated thereby has been placed at a desired level in a shot hole, a charging voltage will be applied to leads 57 and 58 (corresponding to lead wires 54 in FIGURE 1). This charging voltage will be applied when the pressure sensitive switch is not actuated so that the result merely charges the capacitor 59 through resistor 60. Then, when the sequential series of charges is to be detonated, the end charge will be fired creating seismic waves that travel outward in all directions and consequently will be applied to the closest pressure sensitive switch as they reach its location. The leading seismic pressure wave will close the contacts of this switch so as to discharge the capacitor 59 through the closed switch contacts and the heating element of the blasting cap 61 to set off the cap. This then, in turn, detonates the explosive charge itself. Thus, the explosive charge has been set off under control of the pressure sensitive switch contacts.

The reason for employing a resistor 60 is merely to avoid a possible misfiring due to short circuiting of the charging leads 57 and 58 (corresponding to leads 54) which might be caused from the detonation of earlier fired charges in the hole.

FIGURE 4 illustrates the delay time involved in the operation of a switch according to this invention. The illustration shows a representation of a seismic pressure wave 65 that may be visually indicated in the manner illustrated in any convenient manner, e.g. by an oscillograph which makes a trace 66 that is horizontal in the absence of any pressure wave. Such trace moves vertically in the presence of pressure energies so as to create the wave form 65 shown.

Underneath the trace 66 there is shown a dashed line 69 that indicates a condition of the switch contacts when they are in the open position. Another dashed line 70 which is displaced vertically from line 69, is employed to indicate the other condition of the switch elements, i.e. when they are in the closed position. Thus, the FIGURE 4 illustration shows the relationship between the arrival of a pressure wave 65 and the time thereafter when the switch elements are actuated from the open position indicated by dashed line 69, to the closed position indicated by the dashed line 70. As shown, the delay time involved is that indicated by the caption "switch delay" and marked 125 microseconds. The other time markings on the figure merely illustrate the units of time employed in the illustration, i.e. indicating the distance occupied by 100 microseconds.

In view of the delay time involved and to provide for exact reinforcement or synchronism between the leading edge of each pressure wave from one explosive charge to the next, there must be some compensation for the time relay or the pressure wave will have traveled past the charge to be detonated. If the switch delay is reliable and substantially constant a predetermined distance between the diaphragm of the switch elements and the location of the explosive charge may be set up to take care of this delay time. However, in addition it is recognized that various formations will have differing seismic velocity with respect to passage of the seismic pressure waves, so that for a given area and/or depth in a shot hole the spacing from the pressure sensitive switch elements and the charge should be varied depending upon the velocities involved. This may be easily carried out with a unit according to FIGURE 1 by taking into account known velocity conditions and then cutting the sleeve 37 to a predetermined length as readily measured by the calibration markings 41. In this manner the spacing may be set for each charge as it is to be placed in the shot hole, in accordance with the available data. In this connection it may be noted that the sleeve 37 will be attached to the primer unit 32 in any convenient manner after it has been slipped over the smaller diameter portion of the unit 32, such as by employing wire or a pin or a screw, etc. (not shown) or the like. Whatever fastening is employed, the desired spacing will be fixed in a positive manner by reason of the free end of the sleeve 37 being butted against a shoulder 73 on the primer unit 32.

While certain preferred embodiments of the invention have been described above in considerable detail in accordance with the applicable statutes, this is not to be taken as in any way limiting the invention but merely as being descriptive thereof.

What is claimed as the invention is:

1. A fast acting substantially constant delay time pressure sensitive switch for use in seismic sequential shooting and the like comprising a housing, said housing including a reservoir containing a non-conducting liquid, a flat thin first diaphragm attached at the periphery thereof to the housing and covering said reservoir, said diaphragm being adapted to respond to seismic waves impinging on the outer surface thereof, a second diaphragm attached at its periphery to said housing and surrounding said outer surface of said first diaphragm to form a chamber therebetween, a non-conducting liquid contained in said chamber for propagating pressure waves to said first diaphragm, a bladder of compressible gas contained in said reservoir of non-conducting liquid in said housing so as to provide displacement of the liquid in said reservoir in accordance with displacement of said first diaphragm, means for electrically connecting said first diaphragm solely to act as one contact of said switch, and a centrally located conductive material member located very close to but not in contact with said first diaphragm in the absence of any pressure wave actuation of said first diaphragm for acting as the other contact of said switch.

2. A fast acting substantially constant delay time pressure sensitive switch for use in seismic sequential shooting and the like comprising a housing, said housing including a reservoir containing a non-conducting liquid, a flat thin low inertia metallic first diaphragm attached at the periphery thereof to the housing and covering said reservoir, said first diaphragm being adapted to respond to seismic waves impinging on the outer surface thereof, a second diaphragm attached at its periphery to said housing and surrounding said outer surface of said first diaphragm to form a chamber therebetween, a nonconducting liquid contained in said chamber for propagating pressure waves to said first diaphragm, a bladder of compressible gas contained in said reservoir of nonconducting liquid in said housing so as to provide displacement of the liquid in said reservoir in accordance with displacement of said first diaphragm, means for electrically connecting said first diaphragm solely to act as one contact of said switch, and a centrally located conductive material member located very close to but not in contact with said first diaphragm in the absence of any pressure wave actuation of said first diaphragm for acting as the other contact of said switch, said first diaphragm having a small vent passage therethrough for allowing equalization of the static pressure being applied.

3. A fast acting substantially constant delay time pressure sensitive switch for use in seismic sequential shooting and the like comprising a housing, said housing including a reservoir containing a non-conducting liquid, a flat thin low-inertia metallic first diaphragm attached at the periphery thereof to the housing and covering said reservoir, said first diaphragm being adapted to respond to seismic waves impinging on the outer surface thereof, a second diaphragm attached at its periphery to said housing and surrounding said outer surface of said first diaphragm to form a chamber therebetween, a nonconducting liquid contained in said chamber for propagating pressure waves to said first diaphragm, a bladder of compressible gas contained in said reservoir of nonconducting liquid in said housing so as to provide displacement of the liquid in said reservoir in accordance with displacement of said first diaphragm, means for electrically connecting said first diaphragm solely to act as one contact of said switch, and a centrally located conductive material member located very close to but not in contact with said first diaphragm in the absence of any pressure wave actuation of said first diaphragm for acting as the other contact of said switch, and an elongated support structure spacing the foregoing pressure responsive switch elements a predetermined distance away from an explosive charge that is to be detonated under control of the closing of said switch which distance is determined by the inherent switch delay time and the seismic velocity of the formation between said switch and explosive.

4. A fast acting sensitive pressure switch for use in seismic shooting and the like comprising a flat thin at least partially conductive material diaphragm, said diaphragm being adapted to respond to seismic waves, means for electrically connecting said diaphragm solely to act as one contact of said switch, a centrally located conductive material member located very close to but not in contact with said diaphragm in the absence of any seismic wave actuation of the diaphragm, and an elongated support structure spacing the foregoing pressure responsive switch elements a predetermined distance from an explosive charge that is to be detonated under control of the closing of said switch which distance is determined by the inherent switch delay time and the seismic velocity of the formation between said switch and explosive.

5. A fast acting sensitive pressure switch for use in seismic sequential shooting and the like comprising a flat thin at least partially conductive material diaphragm, said diaphragm being adapted to respond to seismic waves, means for electrically connecting said diaphragm solely to act as one contact of said switch, a centrally located conductive material member located very close to but not in contact with said diaphragm in the absence of any seismic wave actuation of the diaphragm, a support structure spacing the foregoing pressure responsive switch elements a predetermined distance from an explosive charge that is to be detonated under control of the closing of said switch, which distance is determined by the inherent switch delay time and the seismic velocity of the formation between said switch and explosive, said support structure comprising a tubular member having said switch attached therein and having calibration markings thereon said structure being adapted for attachment to said explosive charge in such a manner that the spacing will be readily determined from said calibration markings.

6. A fast acting sensitive pressure switch for use in seismic sequential shooting and the like comprising a flat thin conductive material diaphragm, said diaphragm being adapted to respond to seismic waves, means for electrically connecting said diaphragm solely to act as one contact of said switch, a centrally located conductive material member located very close to but not in contact with said diaphragm in the absence of any seismic wave actuation of the diaphragm, a support structure spacing the foregoing pressure responsive switch elements a predetermined distance from an explosive charge that is to be detonated under control of the closing of said switch which distance is determined by the inherent switch delay time and the seismic velocity of the formation between said switch and explosive, said support structure comprising a tubular fibrous material cylinder having said switch attached therein, said cylinder being perforated to equalize pressure therein, said cylinder having calibration markings thereon for use in cutting the cylinder to a predetermined length based on the seismic velocity of the formation surrounding said switch and explosive charge.

7. A fast acting sensitive pressure switch for use in seismic sequential shooting and the like comprising a flat thin low-inertia metallic diaphragm, said diaphragm being adapted to respond to seismic waves, means for electrically connecting said diaphragm solely to act as one contact of said switch, a centrally located conductive material member acting as the other contact of said switch, said member having an extremity thereof located very close to but not in contact with said diaphragm in the absence of any seismic wave actuation of the diaphragm, said diaphragm having a small vent passage therethrough for allowing equalization of the static pressure being applied, a support structure spacing the foregoing pressure responsive switch elements a predetermined distance away from an explosive charge that is to be detonated under control of the closing of said switch which distance is determined by the inherent switch delay time and the seismic velocity of the formation between said switch and explosive, said support structure comprising a tubular fibrous material cylinder having said switch attached therein, said cylinder being perforated to equalize pressure therein, said cylinder having calibration markings thereon for use in cutting the cylinder to a predetermined length based on the seismic velocity of the formation surrounding said switch and explosive charge.

References Cited by the Examiner

UNITED STATES PATENTS

| | | | |
|---|---|---|---|
| 1,958,297 | 5/34 | Decker | 200—83 |
| 2,111,168 | 3/38 | Chansor | 200—83 |
| 2,437,456 | 3/48 | Bodine | 181—05 X |
| 2,811,599 | 10/57 | Statham | 200—83 |
| 2,922,484 | 6/60 | Kelly et al. | 181—53 |

ROBERT K. SCHAEFER, *Acting Primary Examiner.*

RICHARD M. WOOD, BERNARD A. GILHEANY,
*Examiners.*